United States Patent [19]

Christie

[11] 3,747,627
[45] July 24, 1973

[54] PRESSURE REGULATOR AND COMPENSATOR

[75] Inventor: Sidney A. Christie, San Diego, Calif.

[73] Assignee: The United States of America as represented by the Secretary of the Navy, Washington, D.C.

[22] Filed: June 8, 1972

[21] Appl. No.: 260,931

[52] U.S. Cl............ 137/102, 137/116.3, 137/627.5
[51] Int. Cl.. F16k 31/365, G05d 7/00, G05d 16/14
[58] Field of Search............. 137/102, 116.3, 627.5; 251/DIG. 1

[56] References Cited
UNITED STATES PATENTS

| | | | |
|---|---|---|---|
| 2,487,650 | 11/1949 | Grove et al................. | 137/116.3 X |
| 2,824,568 | 2/1958 | Gravenhorst et al........... | 137/116.3 |
| 3,025,881 | 3/1962 | Freeman..................... | 137/627.5 |
| 3,102,549 | 9/1963 | Worden et al................ | 137/116.3 |
| 3,198,481 | 8/1965 | Bryant...................... | 251/DIG. 1 |
| 3,512,552 | 5/1970 | Dobrikin et al.............. | 137/627.5 |
| 3,538,930 | 11/1970 | Kowalski.................... | 137/116.3 X |
| 3,580,646 | 5/1971 | Ternent..................... | 137/627.5 |

Primary Examiner—William R. Cline
Attorney—Richard S. Sciascia, Ervin F. Johnston et al.

[57] ABSTRACT

A pressure compensator includes two reciprocally displacable sealing assemblies for allowing the exchange of fluid to permit overpressure compensation as well as underpressure compensation. In either case, rigid annular mating sealing surfaces cooperate to bear the brunt of the sealing load while either one of two resilient annular four-lobed seals bear against a continuation of the opposed rigid sealing surface to effect the primary sealing. Having the serially arranged heavy-duty rigid sealing surfaces and the resilient four-lobed seal renders the pressure compensator well suited for pressure regulation of gases and permits its interconnection to a source of high-pressure gas without the danger of failure.

7 Claims, 5 Drawing Figures

Patented July 24, 1973  3,747,627

Patented July 24, 1973  3,747,627

PRESSURE REGULATOR AND COMPENSATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Pressure regulation valves for fluids and gases are many and of diversed descriptions. While most achieve some degree of pressure regulation, especially where dealing with liquids by relying on the liquid to help maintain a seal, a single unit capable of reliable pressure compensation between gaseous volumes has yet to be designed. An entire family of valving arrangements supposedly having such a capability employs a spool valve reciprocally displaceable in a bore by a spring-loaded diaphragm. Usually, several O-rings are mounted on the spool to block bypass and, if high supply pressures are fed to the compensator, the O-rings are torn from place causing failure. Other approaches relying on reciprocally displaceable valving arrangements have relied upon a series of O-rings mounted on a piston-like arrangement to step down the pressure differential across the adjacent O-rings. The obvious disadvantage of this approach resides in the inertial or resistive drag of the several O-rings since a certain amount of pressure is required to merely displace this assembly to achieve any degree of pressure compensation. There exists a continuing need for a pressure compensator immediately responsive to small pressure differentials to effect a bidirectional compensation which will additionally handle widely varying magnitudes of supply pressure.

SUMMARY OF THE INVENTION

The invention is directed to providing a bidirectional pressure compensator having a pair of aligned pressure compensation assemblies each including rigid opposed sealing surfaces for handling the heavy-duty sealing load of the assembly and a serially-arranged four-lobed resilient sealing member for effecting primary or fine sealing. Being so arranged and both reciprocally displaceable by an interconnected rigid piston allows overpressure compensation as well as underpressure compensation between gaseous mediums as well as liquid mediums and selective adjustment of biasing members permits the presetting of pressures in the diverse mediums.

A prime object of the invention is to provide a pressure compensator ideally suitable for operation in the gaseous medium.

Another object is to provide a pressure compensator employing reciprocally displacable poppet surfaces.

Still another object is to provide a single pressure compensator for achieving bidirectional overpressure and underpressure compensation.

Yet another object is to provide a pressure compensator employing serially-arranged rigid annular sealing surfaces and resilient sealing surfaces.

A further object is to provide a pressure compensator capable of regulating widely varying magnitudes of supply pressure.

Another object is to provide a bidirectional compensator using four-lobed resilient sealing elements.

These and other objects of the invention will become more readily apparent from the ensuing description when taken with the drawings.

DESCRIPTION OF THE PREFERRED EMBODIMENT

Figure 1A:
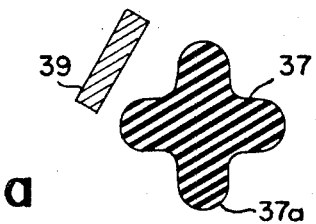
FIG. 1a shows a detail of FIG. 1.
Figure 1B:
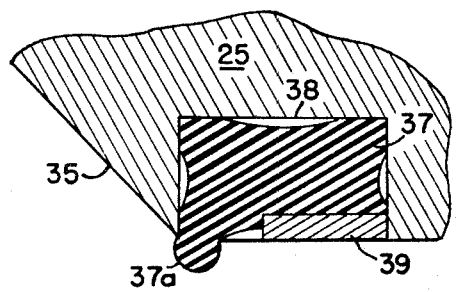
FIG. 1b shows in detail a portion of FIG. 1.
Figure 1:
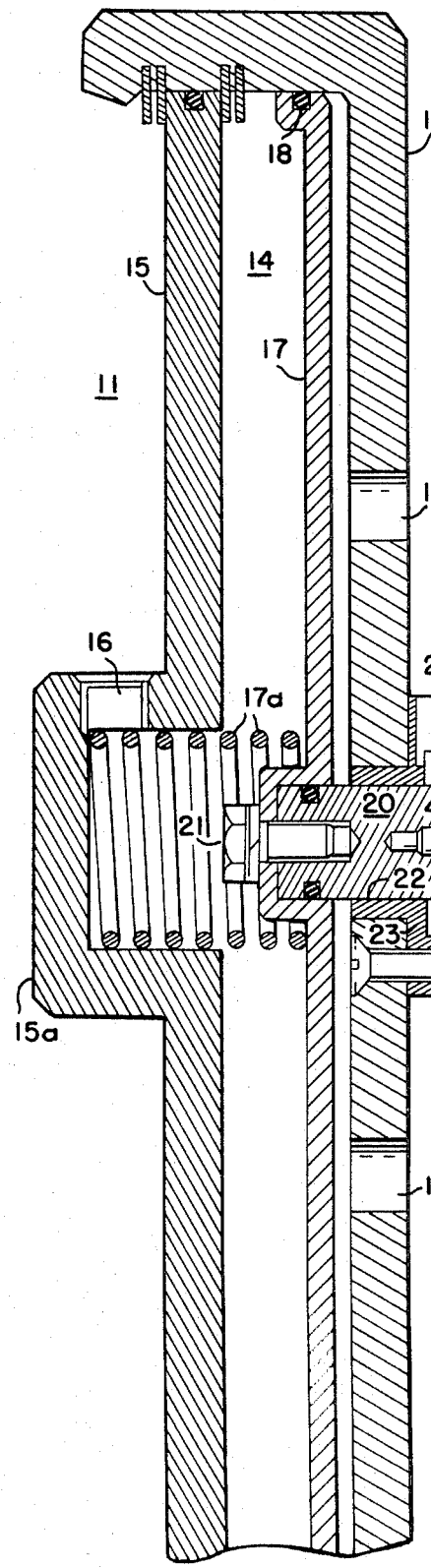
FIG. 1 is a cross-sectional view of the invention in its normal position.

Referring now to FIG. 1 of the drawings, there is shown in cross section the invention in its normal position, that is, its neutral position creating a closed wall effecting no pressure between an area 11 of reference pressure and a pressure-compensated volume 12. A main casing 13 is shaped to define a cup-shaped cavity 14 closed by a sealed disk-shaped wall 15. An inlet port 16 penetrating an outward projection 15a of disk-shaped wall 15 provides a passageway for ambient pressures against the outer surface of a flat piston 17. The flat piston extends across the reaches of cavity 14 and is sealed about its periphery by a conventional O-ring 18. On the opposite side of the flat piston at least one port 19 allows the pressure of compensated volume 12 to be brought to bear against the inner surface of the flat piston.

As with a goodly number of pressure compensators, reciprocal displacement of the flat piston is effected by a pressure differential existing across it and, in this respect, the present invention is similarly actuated. A helical biasing spring 17a exerts a slight pressure against the flat piston to ensure that the pressure in pressure-compensated volume 12 is slightly higher with respect to the pressure in the reference pressure area 11 as determined by the spring's biasing constant. Obviously, the spring optionally is chosen to exert a pulling force on the piston, in which case area 11 would have a higher pressure than volume 12.

The flat piston is secured onto a primary piston 20 by a bolt 21 and a bore 22 is provided in a fitting 23 force fitted into an appropriately sized hole shaped in the main casing. Further into the fitting, a larger bore 24 is reamed to extend the entire length of the fitting. This larger bore is closed by a sealed cap 23a and contains an annular sleeve 25. The sleeve is sized to slidably traverse the length of bore 24 and a pair of O-rings 29 carried in appropriately disposed recesses on the outer surface of the annular sleeve prevent blow-by of any of the gases as the sleeve is reciprocally displaced in outer bore 24. These O-rings optionally are given a very low friction surface treatment to reduce drag at high feed pressures. An internal passageway 30 is shaped in annular sleeve 25 and a follower piston 31 sized for reciprocal motion in the internal passageway carries an O-ring 32 provided to prevent blow-by. Since the follower piston is secured via a follower rod 33 to the primary piston 20, responsive motion of the primary piston as displaced by flat piston 17 is translated to follower piston 31.

Extending from the side of inner bore 22, an outlet port 26 provides a passageway for fluid communication between the inner bore and pressure-compensated volume 12. Similarly, a venting port 27 serves as an egress duct passing gas from pressure-compensated volume 12 to, for example, the reference pressure area 11. A source of pressurized gas is fed to a pressure compensation port 28 machined in the upward side of fitting 23.

A helical biasing spring 34 is held in compression by a follower piston and urges annular sleeve 25 to sealingly engage the annular sleeve along a pair of mating opposed rigid sealing surfaces 35 and 36 provided on the annular sleeve and fitting 23 respectively. These opposed rigid sealing surfaces are precision machined with complimentary surfaces to ensure the blocking of gas-flow from pressure compensation port 28 to outlet port 26 when surfaces 35 and 36 are held in a contiguously abutting relationship. These rigid sealing surfaces cooperate to provide for the heavy-duty sealing or blocking of extremely high supply pressures appearing at port 28 from reaching port 26. In addition, should there be small particles of dust or other impurities in the gas flow which come to rest on the rigid sealing surfaces, the primary or fine sealing of the pressure compensator is provided for by a four-lobed sealing element 37 force fitted and held in an annular groove 38 by a flat retaining ring 39.

The four-lobed sealing element is an off-the-shelf item currently manufactured and marketed by the Minnesota Rubber Company of Minneapolis, Minn. under the trade designation of "QUAD-RING."

Looking to FIGS. 1a and 1b, this sealing element is a resilient composition, such as rubber, compressed and held in place by the flat retaining ring. Being so retained deforms it extruding a single sealing lobe 37a outside the annular groove. This lobe is deformed further as it is forced against an extension of rigid sealing surface 36 to effect the fine sealing. Mounting the four-lobed sealing element as described prevents the element's being blown out of its annular groove as high pressure gas flows over it from, for example, a source of gas having a pressure in excess of 1,000 PSI. Conventional O-ring seals usually would tend to become unseated in this application at these pressures while these sealing elements do not. The retaining ring lies within the same axial projection as the outer surface of annular sleeve 25 to ensure smooth operation of the sleeve as it is reciprocally displaced.

Similarly to the arrangement of the rigid sealing surfaces and resilient sealing element thusly described, a pair of rigid sealing surfaces 40 and 41 are machined to be oriented in an opposing manner on the inside of annular sleeve 25 and the inward beveled surface of primary piston 20. A four-lobed sealing element 42 is disposed in an annular groove 43 and held in place by a flat retaining ring 44. A sealing lobe 42a reaches beyond the surface of rigid sealing surface 40 to effect the primary or fine sealing while rigid sealing surfaces 40 and 41 bear the brunt of any excessively high pressure differential impressed across the compensator.

Reliable positive sealing between both sets of rigid sealing surfaces 35 and 36 and 40 and 41 and the resilient sealing lobes 37a and 42a is owed to their being mounted as poppet sealing surfaces. The reciprocal displacement of the sealing surfaces intorduces minimal wear even after repetitive duty cycles. The machined opposed rigid sealing surfaces thusly are able to return to a sealing engagement again and again to bear the brunt of the heavy pressure differentials across the compensator while the resilient sealing elements are not excessively chafed or worn to ensure fine sealing.

Figure 2:
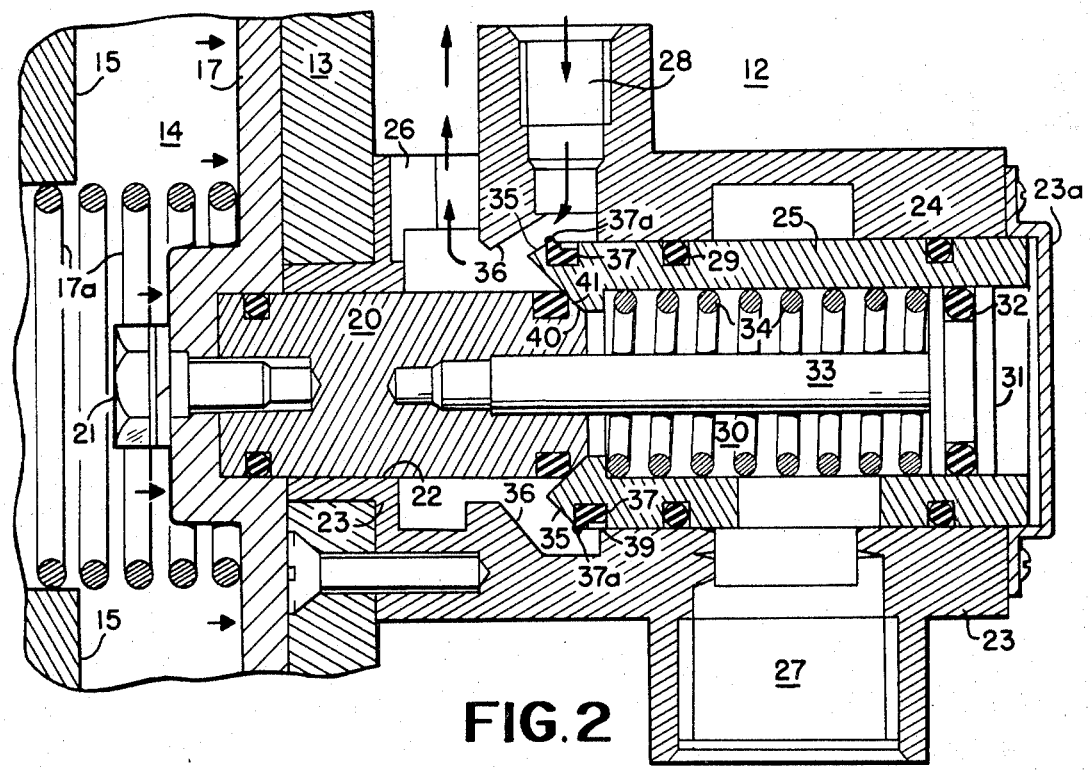
FIG. 2 is a cross-sectional view of the invention providing for underpressure compensation.

Looking to FIG. 2, acutation of the compensator allows for underpressure compensation of volume 12 with respect to area 11. The relatively higher pressure contained in area 11 is brought to bear against flat piston 17 via inlet port 16. As the flat piston is displaced to the right as shown in FIG. 2, primary piston 20 is similarly displaced. The two rigid annular sealing surfaces 40 and 41 and four-lobed sealing element 42 maintain a contact as annular sleeve 25 is moved toward sleeve cover 25a. Pressurized gas suitably interconnected to port 28 rushes into the pressure compensator and flows between rigid sealing surfaces 35 and 36 and over four-lobed sealing element 37 to outlet port 26. Since the four-lobed sealing element is held in place by retaining ring 39, it is not blown from place to ensure a later resealing. After the pressure in volume 12 approaches the magnitude of pressure in area 11 and the biasing effect of biasing spring 17a is overcome, flat piston 17 returns to its normal position bringing rigid sealing surfaces 35 and 36 and sealing lobe 37a of four-lobed sealing element 37 in contact with one another to close off the passageway between port 28 and port 26.

Figure 3:
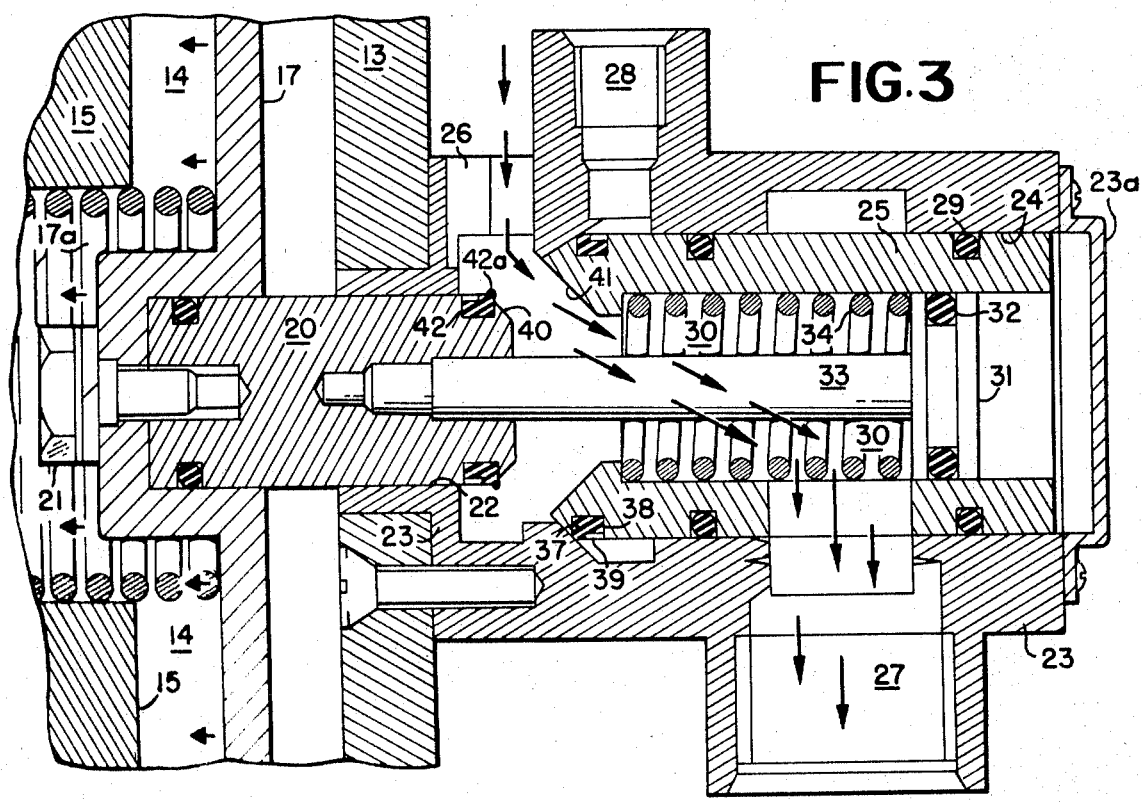
FIG. 3 is a cross-sectional view of the invention providing for overpressure compensation.

If there is too much pressure in volume 12 with respect to the pressure in area 11, flat piston 17 is pushed to the left as shown in FIG. 3. Primary piston 20 is displaced in the same direction to separate rigid sealing surfaces 40 and 41 and to pull sealing lobe 42a of four-lobed sealing element 42 from its sealing engagement. In this mode of operation, port 26, previously functioning as an outlet port, draws gas in from volume 12 and it is vented through the pressure compensator to venting port 27 which is joined to lower pressure sink, not shown in the drawings.

The high pressure gas fed to pressure compensation port 28 is blocked from further passage by the contacting surfaces 35, 36, and 37 which are held in place by the biasing force of spring 34 pushing against an inner shoulder of the annular sleeve. This biasing force is created by the inclusion of a follower piston 31 being carried along with flat piston and the primary piston to compress the helical biasing spring.

What has been described is a pressure compensator employing rigid and resilient poppet surfaces for compensating for under and overpressure. The lack of a plurality of O-rings makes the compensator adaptable for accurate low pressure differential sensing and compensation by reducing the inherent drag introduced by a multiplicity of O-rings yet also provides a capability for handling widely varied or extremely high supply pressures. The four-lobed sealing element secured as disclosed will not blow from place during venting to greatly enhance the compensator's reliability where high pressures must be contained and transferred.

While the above disclosure has concerned itself with gas pressure compensation, it is certainly within the scope of the inventive concept to adapt the pressure compensator for liquid pressure compensation also. However, since sealing and pressure compensation between gaseous mediums poses more exacting requirements, this disclosure has restricted itself to this adaptation for the purposes of illustrating the unique features of this invention.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for compensating for underpressure and overpressure in a chamber with respect to a source of reference pressure comprising:
   a source of higher pressure fluid; and
   a casing having a longitudinal bore and shaped with a casing rigid sealing surface and ports communicating with said source of higher pressure fluid, said source of reference pressure, a pressure vent, and said chamber including,
   a first piston member carried in said casing being responsive to said underpressure to be moved in one direction and to said overpressure to be moved in the opposite direction,
   a primary piston member disposed in said longitudinal bore and connected to said first piston member, said primary piston is provided with a rigid sealing surface and a juxtaposed groove containing a first resilient sealing element,
   a sleeve member disposed in said longitudinal bore provided with a first rigid sealing surface forcefully abutting the piston rigid sealing surface and said first resilient sealing element for closing a passageway between said chamber and said pressure vent and said sleeve member further includes a second rigid sealing surface and a juxtaposed groove containing a second resilient sealing element forcefully abutting said casing rigid sealing surface,
   a follower member secured to said primary piston member and disposed inside said sleeve member, and
   means carried between said follower member and said sleeve member for holding the piston rigid sealing surface and first resilient sealing element and first rigid sealing surface together when said first piston member is displaced in said one direction while said second rigid sealing surface and said second resilient sealing element is removed from said casing rigid sealing surface creating a passageway between said chamber and said source of higher pressure and for further holding said second rigid sealing surface and said second resilient sealing element and said casing rigid sealing surface together when said first piston is displaced in said opposite direction while said piston rigid sealing surface and first resilient sealing element is removed from said first rigid sealing surface for opening a passageway between said chamber and said pressure vent.

2. An apparatus according to claim 1 in which said piston rigid sealing surface, said first and second rigid sealing surface and said casing rigid sealing surface are annular machined surfaces for bearing the brunt of high pressure differentials.

3. An apparatus according to claim 2 further including:
   means mounted in said casing abutting said first piston member for ensuring a pressure differential between said chamber and said source of reference pressure.

4. An apparatus according to claim 3 in which said first resilient sealing element and said second resilient sealing element are each a four-lobed sealing ring.

5. An apparatus according to claim 4 further including:
   a retaining ring holding each four-lobed sealing ring in its respective groove with one lobe extending beyond its juxtaposed rigid sealing surface.

6. An apparatus according to claim 5 in which said first piston member is a rigid disk sealed at its periphery on an internal surface of said casing.

7. An apparatus according to claim 6 further including:
   at least one O-ring carried on the outer surface of said sleeve member and said follower member to prevent blow-by.

* * * * *